United States Patent [19]

Ny

[11] Patent Number: 4,573,085
[45] Date of Patent: Feb. 25, 1986

[54] VIDEO DISC SYSTEM HAVING TRUE AND COMPLEMENTED DIGITAL AUXILIARY INFORMATION CODES

[75] Inventor: Nils O. Ny, Levittown, Pa.

[73] Assignee: RCA Corporation, Princeton, N.J.

[21] Appl. No.: 489,304

[22] Filed: Apr. 28, 1983

[51] Int. Cl.[4] .................................................. H04N 5/91
[52] U.S. Cl. ..................................... 358/342; 358/340
[58] Field of Search .................. 371/38; 358/342, 310, 358/327, 328, 329, 335, 340

[56] References Cited

U.S. PATENT DOCUMENTS

| | | | |
|---|---|---|---|
| 4,307,418 | 12/1981 | Mindel et al. | 360/72.2 |
| 4,308,557 | 12/1981 | Dieterich | 358/342 |
| 4,309,721 | 1/1982 | Christopher | 358/342 |
| 4,313,134 | 1/1982 | Rustman et al. | 358/342 |

*Primary Examiner*—Donald McElheny, Jr.

*Attorney, Agent, or Firm*—P. J. Rasmussen; P. M. Emanuel; R. G. Coalter

[57] ABSTRACT

DAXI information, recorded in the vertical interval of a video disc signal, is augmented by program data encoded in the DAXI format but inverted prior to recording and interleaved between a blank video line and a line containing a masking signal to form a triad of lines. In a video disc player the data is recovered by comb filtering the video signal. A decoder processes the DAXI signal normally for controlling operation of the player but decodes the triad of lines as a data error when the DAXI signal is anticipated or most likely to occur. Program data in each triad is recovered when the DAXI data is not anticipated or least likely to occur by inverting the program data applied to the decoder thereby eliminating the need for a separate decoder in the player for decoding the program data and providing output data for use by an external computer in an interactive application of the video disc player.

3 Claims, 3 Drawing Figures

STATUS FLAG SET·WINDOW CLOSED⇒OUTPUT DATA

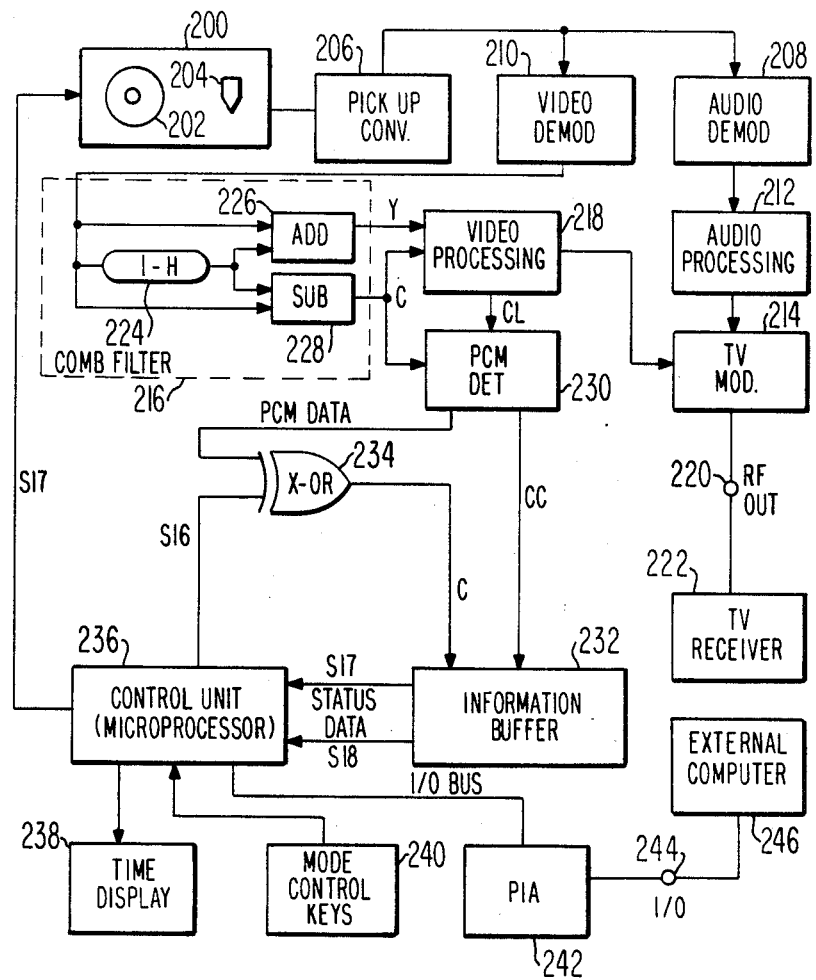
Fig. 2   STATUS FLAG SET·WINDOW CLOSED=>OUTPUT DATA

| | LINE NO. | | SOURCE DATA | XOR 62 | RECORDED DATA | WIN DOW SIG | COMB OUT | XOR OUT | STATUS FLAG | OPERATION |
|---|---|---|---|---|---|---|---|---|---|---|
| | ODD FIELD | EVEN FIELD | | | | | | | | |
| DAXI PAIR | 16 | 278 | BLANK | 0 | BLANK | 0 | 16-15 X | X | 0 | WAIT |
| | 17 | 279 | DAXI | 0 | DAXI | 0 | 17-16 DAXI | DAXI | 1 | DO DAXI |
| PROG. DATA TRIAD 1 | 18 | 280 | BLANK | 0 | BLANK | 1 | 18-17 $\overline{\text{DAXI}}$ | $\overline{\text{DAXI}}$ | 0 | WAIT |
| | 19 | 281 | PROG. | 1 | INV. PROG. | 1 | 19-18 $\overline{\text{PROG.}}$ | PROG | 1 | DO PROG. |
| | 20 | 282 | MASK | 1 | INV. MASK | 1 | 20-19 SCRAM | SCRAM | 0 | WAIT |
| PROG. DATA TRIAD 2 | 21 | 283 | BLANK | 1 | BLANK | 1 | 21-20 SCRAM | SCRAM | 0 | WAIT |
| | 22 | 284 | PROG | 1 | INV. PROG. | 1 | 22-21 PROG | $\overline{\text{PROG}}$ | 1 | DO PROG. |
| | 23 | 285 | MASK | 1 | INV. MASK | 1 | 23-22 SCRAM | SCRAM | 0 | WAIT |

← DAXI ACQUIRED WINDOW NARROW (WINDOW OPEN) · (FLAG) ⇒ DO DAXI CONTROL ROUTINE
(WINDOW CLOSED) · (FLAG) ⇒ DO PROGRAM OUTPUT

Fig. 3

VIDEO DISC SYSTEM HAVING TRUE AND COMPLEMENTED DIGITAL AUXILIARY INFORMATION CODES

FIELD OF THE INVENTION

This invention relates to television systems generally and particularly to video disc systems of the type wherein digital auxillary information is recorded with video information and recovered upon playback of a disc or providing certain player control functions.

BACKGROUND OF THE INVENTION

U.S. Pat. No. 4,308,557 of C. B. Dieterich entitled "VIDEO DISC SYSTEM" which issued Dec. 29, 1981 incorporated herein by reference, describes video disc recording and playback apparatus wherein video fields on a disc are identified by digital information recorded during a selected line of the vertical interval during each field of the recorded video signal. This "auxillary" digital information, commonly known as the system "DAXI" code, is utilized to control a number of video disc player operating functions during playback of the disc such as calculation and display of elapsed playing time, lifting the pick-up stylus at the end of the program material, detection and correction of locked grooves, etc.

As proposed by Dieterich, the recorded DAXI code includes, in the order named, a Barker start code sequence, an error detection check code and a plurality of information bits which include a field number corresponding to the recorded video field. The DAXI code format desirably provides improvements in noise immunity and simplifies the decoding hardware requirements for the player.

Further improvements for decoding the DAXI data of the Dieterich format are described by Christopher in U.S. Pat. No. 4,309,721 entitled "ERROR CODING FOR VIDEO DISC SYSTEM" which issued Jan. 5, 1981. In Christopher's system the error code portion of the DAXI data is chosen so that the error code check register in the video disc player begins with the system start code in the register and, if no errors are detected after the full data message is received, also ends with the start code in the check register. This desirably simplifies the DAXI decoding logic in the video disc player.

Other U.S. Patents relating to use of DAXI code in a video disc player are U.S. Pat. No. 4,307,418 entitled "VIDEO DISC PLAYER SYSTEM FOR CORRELATING STYLUS POSITION WITH INFORMATION PREVIOUSLY DETECTED FROM DISC" which issued Jan. 26, 1982, and U.S. Pat. No. 4,313,134 entitled "TRACK ERROR CORRECTION SYSTEM AS FOR VIDEO DISC PLAYER" which issued Jan. 26, 1982, to Rustman et al.

Video disc records employing the DAXI encoding format are commercially available, for example, from RCA Corporation and CBS, Incorporated. In such records, chrominance information is recorded in the "buried subcarrier" (BSC) format proposed by D. Pritchard in U.S. Pat. No. 3,872,498. The DAXI code is recorded by pulse code modulation (PCM) of the luminance signal level during line 17 of odd fields and line 280 of even fields. The DAXI data comprises a 77 bit PCM word synchronized with the "buried" color subcarrier frequency (about 1.53 MHz for NTSC compatible players) to facilitate subsequent detection in the player by comb filtering. Each DAXI word comprises a 13 bit start code (a Barker sequence for data framing) followed by a 13 bit CRC (cyclic redundancy check) error check code and ending with a 51 bit information code. Of the 51 bits in the information code, 6 provide a record band number, 18 provide a video field identification number and the remaining 27 are currently not assigned but are included to provide information capacity for future expansion or other uses of the DAXI code.

In video disc players for use with DAXI encoded discs, the PCM signal is obtained from the subtractive output tap of a 1-H delay comb filter in the video signal path. Each line of DAXI code is preceeded by a blank video line. As a result of the subtraction of the current and previous video lines, the resultant PCM signal is "self-referenced" and is therefore relatively unaffected by D.C. drift. This simplifies subsequent PCM detection and reduces potential bit errors which might other wise occur without such drift compensation. Examples of video disc players wherein DAXI information is comb filtered prior to PCM detection are given in U.S. Pat. No. 4,275,416 of Dieterich entitled "PCM DETECTOR" and U.S. Pat. No. 4,278,992 of Christopher entitled "PCM DETECTOR FOR VIDEO REPRODUCER APPARATUS".

SUMMARY OF THE INVENTION

In systems of the type described, it would be desirable to provide a source of digital information for use by a device external to the player (e.g., a computer, a game accessory, etc.) to facilitate interactive uses of the video disc system. Since there are currently a total of 27 "unassigned" information bits in the DAXI code, it would appear that these bits might be used to convey "interactive" program control information to the external device. Such an approach has the virtue of simplicity (no additional PCM detectors or error check decoders are needed) but, as is herein recognized, suffers from numerous technical and performance disadvantages as will now be explained.

A first problem is that the DAXI code occurs on only one line per field. This corresponds to a data transfer or "through-put" rate of only 1620 bits per second (60 fields/second times 27 bits/field). A relatively short interactive program of, say, 4000 eight-bit bytes would thus require nearly twenty seconds to read (down load) assuming no redundancy and no error correction. Taking these factors into consideration, it might take a minute or more to transfer even such a simple program to the external computer or other device.

As a second example, it is recognized herein that one cannot avoid the data transfer rate problem by simply increasing the number of DAXI code lines in a given field. This is because conventional video disc players are designed to recognize repeated field numbers as a locked groove condition and to exit the locked groove condition by effecting radial translation of the player pickup stylus (known as stylus "kicking" or skipping"). Accordingly, to preserve compatibility with existing records and players it is required that no video field contain more than one DAXI code line.

The alternative of recording additional auxillary digital information in a format other than the DAXI format is unattractive from a cost standpoint since additional decoding and error checking circuits would be necessary.

It is an object of the present invention to provide a method of recording additional data on a video disc record which is compatible with existing and future video disc players which exploy DAXI or similar control systems which provides a relatively high data density.

It is a further object of the invention to record the data in a format which may be detected and error checked by means of conventional PCM detectors and error check decoder but which does not interfere with normal operation of the player control system in existing or future video disc players.

In accordance with the invention, a method for encoding data on a composite video signal for recording on a video disc comprises generating first and second data words, the first data word including video disc player control information, the second data word including supplementary information. The first data word is encoded in a format including a start code, an error check code and an information code to provide a first line of encoded video signal. The second data word is encoded in a format complementary to the predetermined format to provide a second line of encoded video signal. A line of masking data is encoded in a format different from either of the first and second lines of encoded video signal. The first data word is recorded as a pair of adjacent lines comprising a blank line and the first line of encoded video signal and the second data word is recorded as a triad of adjacent lines, the triad comprising a blank video line, the second line of encoded video signal and the line of masking data in the order named.

A video disc player embodying the invention includes a signal recovery means for playing a video disc record and providing a video output signal having an encoded data component. A comb filter means subtractively combines adjacent lines of each field of said video output signal to separate the data component from the video signal to provide a first line of separated data for each pair of adjacent lines encoded in a first format and a second line of separated data for each triad of adjacent lines encoded in a second format. A logic means provides non-inverting signal coupling when in a first operating state and provides inverting signal coupling when in a second operating state. An error check decoder means is coupled to the comb filter means via the logic means for receiving the lines of data and has a first output for providing an error check decoded data output signal and a second ouput for providing a data status signal indicative of an error check result for the decoded data. A control means places the logic means in the first operating state for enabling error check decoding of each pair of adjacent lines encoded in the first format and places the logic means in the second operating state for enabling the error check decoding of each triad of adjacent lines encoded in the second format.

BRIEF DESCRIPTION OF THE DRAWING

The foregoing and further features of the invention are illustrated in the accompanying drawing wherein like elements are identified by like reference designators and in which:

FIG. 2 is a block diagram of a video disc player embodying the invention; and

FIG. 3 is a table illustrating the data encoding format of the recording system of FIG. 1 and illustrating operation of the video disc player of FIG. 2.

DETAILED DESCRIPTION

Figure 1:
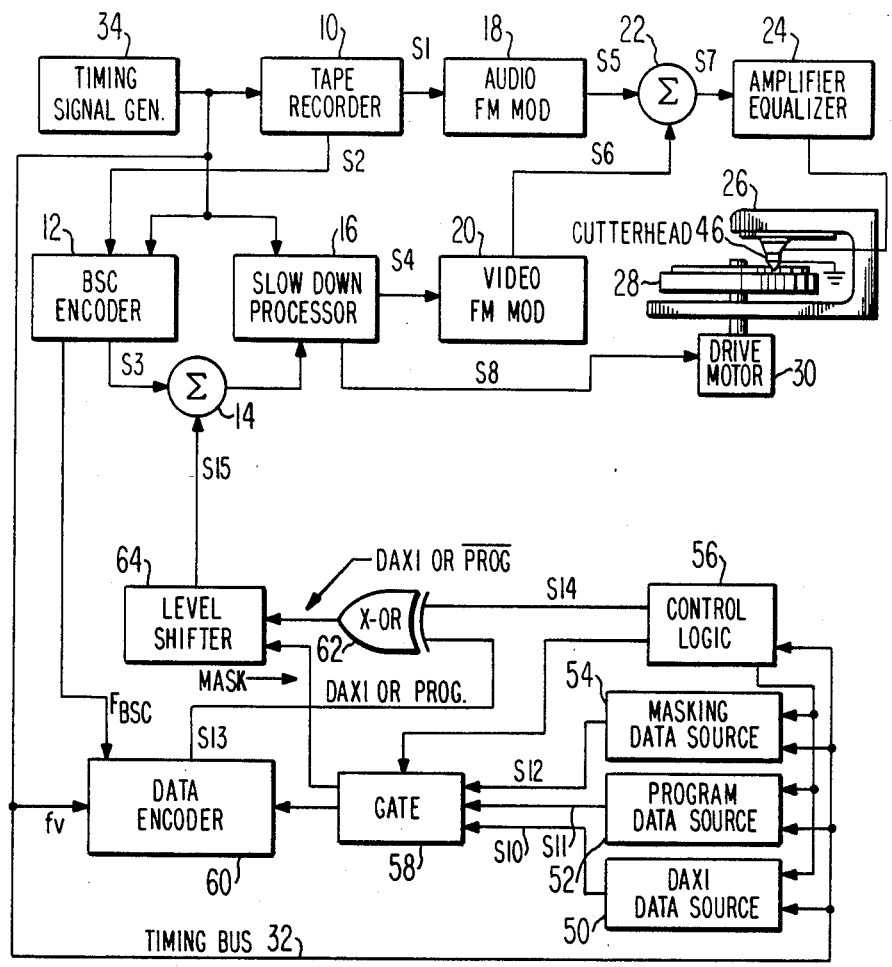
FIG. 1 is a block diagram of a video disc recording system embodying the method according to the invention for encoding and recording digital data on a video disc.

The video disc mastering system of FIG. 1 includes a video tape recorder 10 for providing a source of audio signal S1 and video signal S2 to be recorded. Recorder 10 is preferably a slow motion recorded provided with automatic scan tracking (AST) to facilitate mastering at half rate (one half normal playback speed) using the skip field mastering technique described in detail in U.S. Pat. No. 4,277,796 of M. Ross entitled "SLOW DOWN COLOR PROCESSOR FOR VIDEO DISC MASTERING USING A SPECIAL MODE VTR". The video signal S1 is applied to a buried subcarrier (BSC) encoder 12 which, preferably, is of the type described in the aforementioned Pritchard U.S. Pat. No. 3,872,498. In the BSC format chrominance information is represented by a color subcarrier of the general form employed in the well known NTSC format but is buried in a lower portion of the video band rather than being located in the high end of the luminance signal band. An illustrative subcarrier frequency choice is in the vicinity of 1.53 MHz with the color subcarrier sidebands extending plus or minus 500 KHz thereabout and with the luminance signal band extending well above the highest color subcarrier frequency (to 3 MHz, for example).

The BSC encoded video signal is applied via a summing circuit 14 to a video slow down processor 16 which preferably is of the type described in the Ross patent. Briefly, in the Ross system selected fields of the redundant field (slow motion) video signal S3 are stored in a memory in processor 16 at a standard clock rate and recovered at a lower clock rate that is inversely proportional to the number of times each field is repeated so as to produce a non-redundant video output signal (S4 here) of reduced bandwidth. The bandwidth of the audio signal S1 is reduced by the same factor as the video signal (one half) during operation of recorder 10 in the slow motion mode. The audio signal S1 and the processed video signal S2 are applied to respective frequency modulators 18 and 20 and the resultant frequency modulated signals S5 and S6, respectively, are combined in a summing circuit 22 to form a resultant composite recording signal S7 processing the full informational content of the original audio and video signals.

The recording signal S7 is applied via an amplifier/equalizer 24 to the cutterhead 46 of a recording lathe 26. The turntable 28 of lathe 26 is rotated by a drive motor 30 which receives half-rate drive signals S8 produced by processor 16 whereby full bandwidth master recordings may be made with a cutterhead of lesser bandwidth. Synchronization of recorder 10, encoder 12, processor 16 and remaining elements of the mastering system is provided by means of a timing bus 32 supplied with timing signals (e.g., vertical, horizontal, color subcarrier, etc.) produced by a timing signal generator 34. A generator suitable for producing NTSC format standard video timing signal is the Tektroniz Model 146 NTSC Test Signal Generator. (For mastering in other formats such as PAL or SECAM an appropriate generator should be used).

The remaining elements of the mastering system encode digital data for recording along with the video signal S3 on lathe 26. Three data sources are provided, namely, a DAXI data source 50, a "program" data source 52 and a "masking" data source 54. The sources receive timing signals from bus 32 and are selectively enable by control signals produced by a control logic unit 56 which also receives timing signals from bus 32. DAXI data source 50, illustratively, is of the type described in the aforementioned Dieterich and other patents relating to DAXI coding and provides video field and band numbers and other suitable information relating to the video signal produced by recorder 10 (e.g., bits may be assigned to identify monophonic or stereophonic or bilingual material, etc.). As an illustration, field identification numbers may be produced by source 50 by counting vertical field pulses provided by bus 32. Alternatively, source 50 may be coupled to receive a SMPTE time code signal provided by recorder 10 and "compute" the corresponding field numbers therefrom.

Program data source 52 may comprise, illustratively, a disc memory or other suitable source of digital data to be recorded on the video disc for ultimate use by an external device coupled to a disc player. For purposes of illustration and explanation it will be assumed that source 52 provides data (when enabled by logic unit 56) in word lengths of 51 bits which corresponds to the number of information bits per word provided by DAXI data source 50.

The masking data source 54 produces, when activated by control logic unit 56, a 77 bit data sequence selected to correspond to a framing error and/or a CRC error check error when ultimately comb filtered and decoded in either normal or complemented (inverted) form by a standard DAXI decoding algorithmn. As an example, the masking data may include a start code which is different from and not the complement of the bit sequence 1111100110101 which is the standard DAXI start code. In addition, or in the alternative, the masking data may be produced by polynomial division using a generator polynomial different from that described by Dieterich. For reasons explained in detail subsequently, the principal characteristic of the "masking" data is that it be unrecognizable as a valid DAXI code sequence in either its true (non-inverted) form or in its complemented (inverted) form in a video disc player having a standard DAXI decoder.

The DAXI data (S10), program data (S11) and masking data (S12) are applied to a gate 58 controlled by control logic unit 56. During video lines 16 and 278 all data sources are disabled. During video lines 17 and 279 of odd and even fields, respectively, gate 58 couples the DAXI signal S10 to a data encoder 60 which adds the Barker start sequence and error check code bits to the information code (S10) to provide an encoded output signal S13 in the standard DAXI format (77 bits as described by Dieterich). The DAXI encoded data S13 is coupled via an exclusive-OR gate 62 to a level shifter 64 which translates the logic level signal S13 to a video voltage level to provide a PCM encoded video signal S14 to summing circuit 14. Gate 62 receives a low level control signal (logic zero) from control logic unit 56 during lines 17 and 279 whereby the DAXI code is recorded in its normal polarity.

The table of FIG. 3 summarizes the recording of the DAXI code. Specifically, the DAXI code is recorded as a pair of video lines with each line of DAXI code preceeded by a blank line and with one "DAXI Pair" of lines recorded in each field. The reason for the blank line preceeding each DAXI line is that in video disc players which utilize DAXI coding, the code is separated from the recovered video signal by means of a comb filter which subtracts adjacent lines of video signal. This self references the recovered PCM signal as previously mentioned but requires that the delay line of the comb filter be "empty", so to speak, when the DAXI code is being read (detected) to prevent interference with previous contents of the delay line.

Recording of the "program" data differs from that of the DAXI information in two important respects. Firstly, the fully encoded program data is complemented (inverted) by gate 62 prior to being applied to summing circuit 14. Secondly, every line of program data is immediately followed by a line of masking data and always preceeded by a blank line forming a triad of lines rather than a pair of lines as in the DAXI recording.

In more detail, during lines 18 and 280 of the odd and even fields, respectively, control logic unit 56 disables sources 50, 52 and 54. These lines are blank lines in the vertical interval, accordingly, each "program" data triad beings with a blank line. During lines 19 and 281 unit 56 enables gate 58 to couple signal S11 to encoder 60 which encodes the program data in the standard 77 bit DAXI format. At the same time, unit 56 supplies a high level control signal (S14) to exclusive-OR gate 62 which complements the encoded program data prior to recording.

It is instructive to note at this point that the first two lines of a program data triad are similar to a DAXI line pair except for the inversion of the encoded program data line. The program data is thus in a format line an "upside down" DAXI code and it may be detected and error checked in a standard DAXI decoder if it is reinverted prior to decoding. This must be done, as will be explained subsequently in connection with a video disc player embodying the invention, only when the true DAXI code is not anticipated or least likely to occur. There remains a problem, however, with regard to the player comb filter. Recall that the DAXI code is obtained from a subtractive output of the player comb filter. If the program data is followed by a blank line, then the player comb filter will itself invert the program data. If this were allowed to happen, then the player microprocessor would interpret the program data as DAXI data and would attempt to process it as if it represented a valid field number. Such an occurrence (misreading program data for DAXI data) would in all likelihood substantially impede proper player performance since field tracking information might be lost.

Erroneous decoding of the complemented program data as DAXI information is avoided by following each line of program data with a line of masking data. Specifically, control logic unit 56 enables gate 58 during lines 20 and 282 to couple the masking data signal S12 to level shifter 54. The masking data is thus recorded after each line of program data in a program data triad as illustrated in FIG. 3 (two program data triads are shown in the table). Since the masking data does not resemble a valid start code or error check code it cannot be recognized by a DAXI decoder even when followed or preceeded by a blank line. Also, when the program data is present in the comb filter delay line, the appearance of the masking data "scrambles" the output signal of the comb filter to insure that the resultant signal is undetectable by a standard DAXI decoder.

The video disc player of FIG. 2 comprises a player mechanism 200 having a turntable for rotating a video disc record 202 and a pick-up transducer 204 for recovering video signal from the disc by sensing capacitance variations between a stylus in transducer 204 and the disc being played. Data is assumed to be recorded on the disc in the format previously described. The output of transducer 204 is coupled to a capacitance-to-voltage converter 206 which provides an output signal to audio and video demodulators 208 and 210, respectively. The demodulated audio signal is applied via an audio processing unit 212 to one input of a TV modulator 214 and the demodulated video signal is applied to the other input of modulator 214 via a comb filter 216 and a video processing unit 218. Modulator 214 provides an RF output signal inclusive of picture and sound components on a selected TV channel to a television receiver 222.

Comb filter 216 comprises a 1-H delay line for delaying the demodulated video signal by one horizontal line, an adder 226 for adding adjacent lines to provide a luminance output signal Y to processing unit 218 and a subtractor 228 for subtracting adjacent lines and providing a chrominance output signal C to unit 218. The subtractor output tap also contains vertical detail information and the digital data encoded in the format previously described.

The data is detected by means of a PCM detector 230 which receives 1.53 MHz clock signals (the BSC reference frequency) from an oscillator in unit 218 and PCM data from the subtractive output of comb filter 216. Detector 230 supplies a retimed clock signal CL to one input of an information buffer 232 and supplies detected PCM data to another input of buffer 232 via an exclusive-OR gate 234. Buffer 232 includes logic circuits (as described by Dieterich, for example) for detectng valid start codes and for providing error check decoding the PCM data. When error free data is detected with the correct start code buffer 232 supplies a "valid data" status signal S17 and the data S18 to a control unit 236 (a microprocessor) which normally processes the data to supply an elapsed time signal to a time display unit 238 and stylus tracking and control signals S17 to player mechanism 200. Unit 236 also receives player mode control signals from a mode control key unit 240.

To facilitate use of the player in interactive video disc applications, an output port of unit 236 is coupled via a peripherial interface adapter (PIA) 242 to an input/output terminal 244 coupled to an external computer 246. Computer 246 is suitably programmed to accept the program data recovered from disc 202, as will be described, and to supply control data to the player control microprocessor for controlling selection of player operating modes, stylus tracking, etc. DAXI data is distinguished from the recorded program data with the aid of a DAXI window signal S16 produced in microprocessor 236 which controls the state (inverting or non-inverting) of exclusive-OR gate 234 as will now be described.

Referring to FIG. 3, during lines 16–18 the window signal S16 is low. This corresponds to a period of time when the DAXI signal is expected and during this period gate 234 is placed in its non-inverting mode. Accordingly, the status flag is set during line 17 when the DAXI signal appears and the player microprocessor processes the DAXI signal normally to compute the elapsed playing time and field number sequence. The "window" signal S16, it will be noted is "wider", so to speak, than the DAXI signal. When the player is first placed in the play mode the window may be "open" for a complete field to assure acquisition of the DAXI code and then it may be narrowed to a few lines when the code is acquired to avoid false DAXI "reads". Dieterich, and others, describe suitable programs for providing variable data windows for DAXI code acquisition.

In the present invention the DAXI data window controls gate 234 and effectively "scrambles" the program data when the player control microprocessor is in the DAXI acquire mode. Once the DAXI data is "acquired", the data window is closed (signified by a logic one in FIG. 3) and the exclusive-OR gate then inverts the program data on line 19, for example, which places the program data in the correct DAXI format. This done, information buffer 232 checks the validity of the program data and sets the status flag (S17) whereupon microprocessor 236 then outputs the program data to computer 246 via PIA 242. The masking data accompanying each triad of program data lines functions as previously described to prevent the comb filter from inverting the program data stored therein during line 19 and thus prevents the program data from being interpreted as valid DAXI data after DAXI acquisition.

What is claimed is:

1. A video disc player, comprising:
   signal recovery means for playing a video disc record and providing a video output signal in raster line scan form, selected horizontal lines of each field thereof having an error check encoded data component;
   comb filter means for subtractively combining sequentially occurring lines of said video output signal to separate said data component from said video signal to provide a first line of separated data from each pair of sequentially occurring lines encoded in a first format and a second line of separated data for each triad of sequentially occurring lines encoded in a second format;
   logic means having a first operating state for providing non-inverting signal coupling and having a second operating state for provding inverting signal coupling;
   error check decoder means coupled to said comb filter means via said logic means for receiving said lines of said data and having a first output for providing an error check decoded data output signal and a second output for providing a data status signal indicative of an error check result; and
   control means for placing said logic means in said first operating state for enabling error check decoding of each said pair of sequentially occurring lines encoded in said first format and for placing said logic means in said second operating state for enabling the error check decoding of each said triad of sequentially occurring lines encoded in said second format.

2. A video disc player as recited in claim 1 wherein said logic means comprises an exclusive-OR gate having a first input coupled to a subtractive output tap of said comb filter means, a second input coupled to receive a control signal and an output coupled to a data input of said error check decoder means; and wherein
   said control means includes means for supplying said control signal to said gate at a first level during at least two sequentially occurring lines of each video field and at a second level during the remaining lines of each video field.

3. A video disc player, comprising:
   signal recovery means for playing a video disc record and providing a video output signal in raster line scan form, selected horizontal lines of each field thereof having a data component;

comb filter means for subtractively combining sequentially occurring lines of said video output signal to separate said data component therefrom;

error check decoder means coupled via a signal path to a subtractive output tap of said comb filter means for receiving said separated data component and having a first output for providing a processed data signal and a second output for providing a data status signal;

logic gate means interposed in said signal path for complementing said separated data component during selected lines of each video field; and output means coupled to said error check decoder means for coupling said processed data signal to an output port of said video disc player when said separated data component is complemented by said logic gate means and said data status signal is in a condition indicative of an error free condition of said processed data signal.

* * * * *